United States Patent [19]
Tsukada

[11] Patent Number: 5,487,799
[45] Date of Patent: Jan. 30, 1996

[54] METHOD OF PREVENTING FIRE IN SHIP ENGINE ROOM BY WRAPPING PROTECTED AREA WITH A LAMINATED MATERIAL

[75] Inventor: Ken Tsukada, Tokyo, Japan

[73] Assignee: Tokyo Nisshin Jahara Co., Ltd., Tokyo, Japan

[21] Appl. No.: 241,410

[22] Filed: May 11, 1994

[30] Foreign Application Priority Data

May 25, 1993 [JP] Japan .................................. 5-145688

[51] Int. Cl.$^6$ .............................. E04B 2/00; B32B 31/00; B27N 9/00; B63B 17/00
[52] U.S. Cl. ...................... 156/71; 52/741.3; 52/DIG. 7; 114/361; 156/192; 156/247; 156/257; 220/88.1; 428/920; 428/921
[58] Field of Search ...................... 428/920, 921; 114/361; 52/741.3, DIG. 7; 220/88.1; 156/71, 187, 188, 184, 193, 192, 195, 247, 257

[56] References Cited

U.S. PATENT DOCUMENTS 4,073,998  2/1978  O'Conner .................................. 428/310
4,500,593  2/1985  Weber ...................................... 428/257
4,600,634  7/1986  Langer ..................................... 428/220

FOREIGN PATENT DOCUMENTS 2-93077  4/1992  Japan .............................. F16L 57/00

Primary Examiner—James D. Withers
Attorney, Agent, or Firm—Rogers & Killeen

[57] ABSTRACT

A laminated material for preventing fire in the engine room of a ship has a base layer made of a woven or nonwoven fabric of specific fibers, and aluminum foil or the like bonded to at least one side of the base layer. Since aluminum foil or the similar foil having an excellent sealing ability and a property of plastic deformability is bonded to one or both of the opposite surfaces of the base layer having excellent heat resistance, excellent oil resistance and sufficient strength, defects of the fabric and those of aluminum foil are eliminated, and synergistic benefits can be obtained. In a method for preventing fire in the engine room of a ship, the laminated material is cut out to obtain a laminated tape and a laminated sheet, which are used in combination to cover portions having various configurations. According to this method, even unskilled persons can securely cover portions from which oil is likely to spout.

7 Claims, 4 Drawing Sheets

METHOD OF PREVENTING FIRE IN SHIP ENGINE ROOM BY WRAPPING PROTECTED AREA WITH A LAMINATED MATERIAL

BACKGROUND OF THE INVENTION

1. Field of the Invention

The present invention relates to a laminated material useful for preventing ship fire caused by spouting of fuel oil or the like, and a method of preventing fire due to spouting of fuel oil or the like by using the laminated material.

2. Discussion of the Related Art

Recently, ship fires have occurred frequently, and in the past thirteen years from 1980 to 1992, 73 ships experienced fires in the engine rooms (small fires and fires which were not reported due to sinking of ships are excluded).

The primary cause of the engine room fires was spouting of fuel oil or lubricant oil from a fuel oil piping device or a lubricant oil piping device. In detail, one of fuel oil piping devices or lubricant oil piping devices connected to a main engine and an auxiliary engine for a generator (hereinafter simply referred to as "auxiliary engine") got loose, generated cracks, or got out of place by vibrations of engines to cause spouting of oils. The spouted oil contacted a surface having a high temperature, such as an exhaust pipe and a pipe of a turbo charger to catch fire. About 60% of the engine room fires were caused by the above-mentioned oil spouting.

Spouting of fuel oil from fuel oil piping devices connected to a main engine is caused, for example, by breakage of fastening bolts for securing an inlet flange of a fuel oil supply pipe to a fuel injection pump, coming off a drain valve connected to the fuel oil supply pipe, breakage of an air vent pipe connected to the fuel oil supply pipe, breakage of a cock connected to a fuel oil return pipe, breakage of a short vinyl hose coupled to the fuel oil return pipe, and cracking of a welded potion of a connector for the fuel oil supply pipe. Spouting of fuel oil from fuel oil piping devices connected to an auxiliary engine is caused, for example, by breakage of a cooling oil pipe for a fuel valve, looseness of a fuel oil supply pipe, breakage of a pressure measurement pipe connected to the fuel oil supply pipe, breakage of a pipe connected to a differential pressure gauge of a fuel oil filter due to explosion of an intake pipe, and looseness of a connector for a fuel injection pump.

In view of the foregoing, a world-wide study has started to develop means for preventing oil from spouting out of fuel oil piping devices or lubricant oil piping devices connected to a main engine or an auxiliary engine.

On approach proposed is to make high-pressure pipes for a high-pressure fuel pump, a fuel injection valve and the like double structured. However, since replacing the high pressure pipes in the existing ships with the proposed double pipes would incur large costs, it is practically unrealistic to use the double pipe in all ships.

It was also considered to use a cover devised by the inventors of the present invention for preventing the leaking of oil (Japanese Utility Model Application No. 2-93077). According to the device, a cover is provided with a fastener for facilitating the attachment of the cover to the existing piping devices. However, the cover is not satisfactory because of its size. It is too large to cover the above-described portions from which oils spout. The spouting portions are generally very small, and spouting sometimes occurs at locations at which pipes are screwed to walls. Although covers of reduced size may be manufactured, they involve difficulties in the attachment of small fasteners to them, which results in increased costs. In addition, the conventional covers have the drawback that they are in danger of being broken when they are subjected to spouting pressure of fuel oil, which is as high as a few tens $kg/cm^2$.

Covering the above-described spouting portions by winding them up with a resinous adhesive tape is another idea. However, resinous adhesive tapes are accompanied by shortcomings of being torn due to high spouting pressure of fuel oil. When an adhesive cloth tape is used for covering the spouting portions by winding them up, another problem arises that a spray of fuel oil spouting through the texture of the cloth cannot be prevented. Namely, it is difficult to obtain a sufficient sealing property. In the case where the spreading portions have a complicated shape, it is impossible to wrap up such portions by a resinous adhesive tape or an adhesive cloth tape.

SUMMARY OF THE INVENTION

An object of the present invention is to provide a laminated material for preventing fire in the engine room of a ship, which has excellent pressure resistance and excellent sealing property, and which is capable of preventing fire in the engine room by securely stopping spouting of oil from fuel oil piping devices or lubricant oil piping devices connected to a main engine or an auxiliary engine.

Another object of the present invention is to provide a method of preventing fire in the engine room of a ship, in which a laminated material is used for preventing spouting of oil even in the case where oil spouts from small and/or complicated portions of fuel oil piping devices and lubricant oil piping devices connected to a main engine and an auxiliary engine. The method provides excellent workability in the winding work of the laminated material, and prevents spouting of fuel oil at a low cost.

DESCRIPTION OF THE INVENTION AND PREFERRED EMBODIMENTS

Figure 1:
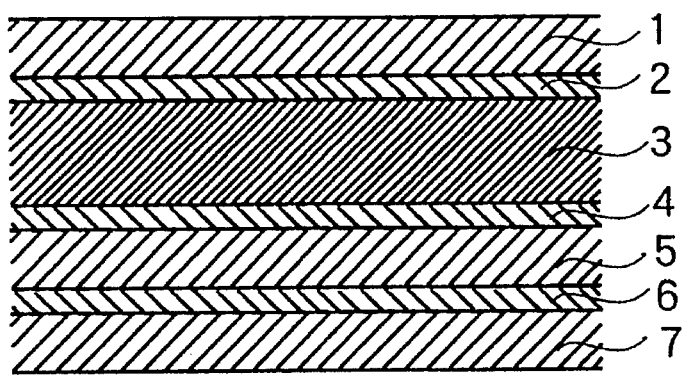
FIG. 1 is a sectional view showing an example of the laminated material for preventing fire in the engine room of a ship according to the present invention.

Laminated materials for preventing fire in the engine room of a ship according to the present invention includes at least one laminated structure which comprises a base layer made of a fabric selected from the group consisting of a woven fabric of synthetic fibers, a nonwoven fabric of synthetic fibers, a woven fabric of carbon fibers, a nonwoven fabric of carbon fibers, a woven fabric of glass fibers and a nonwoven fabric of glass fibers, and aluminum or copper foil bonded to one or both of the opposite surfaces of the base layer.

Of the fabrics used as the basic layer, woven and non-woven fabrics of synthetic fibers are preferred, and woven fabrics of synthetic fibers are more preferred. Of the woven fabrics of synthetic fibers, woven fabrics of polyamide fibers are particularly preferred. Preferable examples of the polyamide fibers are aramid fibers, among which Kevlar (trademark, product of Du Pont Co.) is particularly preferred.

Although the synthetic fibers, carbon fibers and glass fibers used for the base layer are all preferable because of their heat resistant properties, synthetic fibers are more preferable from the viewpoint of oil resistance, wear resistance, weather-proofness, pressure resistance, costs and the like. Among the synthetic fibers, aramid fibers are particularly preferable, because they have excellent flexibility and bendability, not to speak of excellent tensile strength. In addition, a fabric of aramid fibers can be freely formed into various shapes as compared to a fabric of glass fibers without causing breakage of fibers, which is especially likely to be caused by the vibration of engine rooms.

Commercially available aluminum foil and copper foil may be used as the foil bonded to the base layer. Although no particular limitation is imposed on the thickness, thickness in the range of 0.01–1.0 mm is preferred. Aluminum foil is more preferable than copper foil in view of costs and workability. Although the following description mainly refers to the case where aluminum foil is used, it should not be construed as limiting the present invention.

The aluminum foil may be bonded to only one of the opposite surfaces of the base layer, but it is preferred that the foil be bonded to both surfaces of the base layer.

Since sealing property is obtained by providing one or both surfaces of a woven fabric of synthetic fibers or the like with aluminum foil, fuel oil is securely prevented from spouting out in spray through the texture of the woven fabric of synthetic fibers. Moreover, the resulting laminated material can cover portions having a complicated shape owing to the plastic deformation of the aluminum foil.

Although the laminated material according to the present invention which are made in the above-described manner can be used as is, it is preferred that a peelable separator layer be provided on the outer surface of aluminum foil. Although any kind of material may be used to form the separator layer, resinous film or paper is advisable.

Examples of adhesives and bonding agents used for forming the bonding layer are silicon-containing adhesives and silicon-containing bonding agents from the viewpoint of heat resistance, oil resistance, weather-proofness and the like. For the bonding layer between the aluminum foil and the separator layer, self-fusion types and self-vulcanizing types are preferred among silicon-containing adhesives and bonding agents.

In the present invention, a layered material prepared in the above-described manner can be used singly or in combination of two or more sets of layered material.

No particular limitation is imposed on the method of preparing the above-described laminated material. For example, an adhesive or a bonding agent is applied to or laminated on one surface and/or the other surface of the base layer, and aluminum foil is then placed thereon for bonding. Subsequently, a separator layer is attached to the laminated material by the use of an adhesive or a bonding agent.

The layered material manufactured in the above-described manner can be used as a laminated tape or as a laminated sheet.

Embodiments of the present invention will now be described with reference to the attached drawings.

FIG. 1 is a sectional view showing an example of the laminated material for preventing fire in the engine room of a ship according to the present invention. In FIG. 1, numeral 1 denotes aluminum foil, numeral 2 denotes a bonding layer, numeral 3 denotes a base layer, numeral 4 denotes another bonding layer, numeral 5 denotes aluminum foil, numeral 6 denotes an adhesive layer, and numeral 7 denotes a separator layer.

Figure 2:
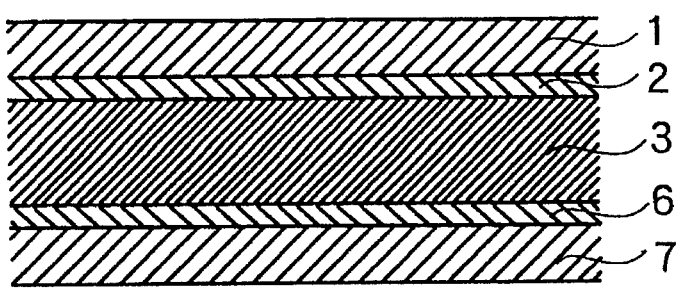
FIG. 2 is a sectional view showing another example of the laminated material for preventing fire in the engine room of a ship according to the present invention.

FIG. 2 is a sectional view showing another example of the laminated material for preventing fire in the engine room of a ship according to the present invention. In the laminated material shown in FIG. 2, the bonding layer 4 and the aluminum foil 5 of FIG. 1 are omitted. Although the separator layer 7 may be provided on the aluminum foil 1, it is preferred that the separator layer 7 be provided to be adjacent to the base layer 3.

When the laminated materials shown in FIG. 1 and FIG. 2 are used as a laminated sheet for preventing fire in the engine room of a ship, it is preferred to previously cut out the laminated sheet to have a size necessary for covering a portion of fuel oil piping devices and lubricant oil piping devices of a main engine and an auxiliary engine from which oil is spouting. It is especially advisable that laminated sheets having different sizes, for example, 50 mm×100 m, 100 mm×100 m and 200 mm×100 m are prepared in advance. This allows each worker to select a size suitable for a portion to be covered. It is preferred that a separator layer be formed on one side of the laminated sheet by the use of an adhesive layer, as shown in FIGS. 1 and 2.

The above-described laminated sheets can be used as a protection cover which covers the entire surface having a high temperature in an engine room so as to prevent fuel oil or the like from contacting the high temperature surface.

In the case where the laminated material is used as a laminated tape, it is preferred that various tapes having different widths, for example, 25 mm, 50 mm, and 70 mm be prepared so that each worker can select a tape having a suitable width. It is preferred that a separator layer be formed on one side of the laminated tape, as shown in FIGS. 1 and 2.

Since aluminum foil or the like having excellent sealing property and plastic deformability is bonded to one or both surfaces of a base layer which has excellent heat resistance, oil resistance and strength, the deficiencies of woven fabrics of synthetic fibers or the like, i.e., lack of sufficient sealing property and plastic deformation, and deficiencies of aluminum foil, i.e., lack of strength sufficient to endure high spouting pressure are eliminated by the combined use of aluminum foil and a synthetic fabric. Synergistic benefits can thus be obtained.

Accordingly, oil spouting portions having various shapes can be securely covered at a lower cost than in the case where conventional double pipes are used for preventing fuel oil from spouting. In addition, the layered materials of the invention can be used for any existing ships.

In comparison with covers having fasteners for covering existing piping devices, the laminated materials according to the present invention are more advantageous in that they can cover portions from which fuel oil is spouting, even when such portions are very small, due to their excellent plastic deformation property. Besides, when compared to resinous or fabric adhesive tapes, the laminated materials according to the present invention are more advantageous in that they can cover portions from which fuel oil is spouting even when such portions have a complicated shape, because the laminated materials according to the present invention have excellent property of plastic deformation, excellent heat resistance, excellent weather-proofness and excellent oil resistance.

Since the laminated materials according to the present invention are also excellent in strength, they will not break or allow oil to spout even when the spouting pressure of fuel oil is extremely high, for example a few tens $kg/cm^2$, unlike the conventional covers having fasteners for existing piping devices and resinous adhesive tapes. Since the laminated materials are superior to fabric adhesive tapes with regard to the sealing property, it is possible to prevent fuel oil from spouting through the texture of the fabric layer.

Moreover, the weather-proofness of the laminated materials according to the present invention prevents the performance of the laminated material from deteriorating even after use for a prolonged period of time. Since the surface is covered by aluminum foil, the laminated materials will not catch fire even when flame gets close to them.

In the case where the base layer is made of a woven fabric of polyamide fibers, in particular, a woven fabric of aramid fibers, the laminated materials can be formed into a variety of shapes which glass fibers cannot achieve. Moreover, since the fibers of the woven fabric do not break under vibration in engine rooms, the above-mentioned effects are enhanced. In addition, because parts for piping such as nuts and unions, and accessories for screwing pipes are tightly covered by the layered materials, these parts and accessories are prevented from getting lose and dropping off due to vibration in engine rooms. Method of preventing fire in the engine room of a ship:

A method of preventing fire in the engine room of a ship includes a first method in which only a laminated tape is used, a second method in which a laminated sheet and a laminated tape are used in combination, and a third method in which these tape and sheet are used in combination with a protection cover provided for covering an outer surface having a high temperature.

In the first method in which only a laminated tape is used, a laminated material prepared in the above-described manner is cut out into a strip-like shape to obtain a laminated tape, which is then wound around a portion from which fuel oil is supposed to spout. In the case where the laminated tape has a separator layer, the laminated tape is wound after the separator layer has been peeled off. Although there is no limitation on the number of turns, it is preferred that the number of turns is two or more. The method of manufacturing the laminated tape has already been described above.

In the second method in which a laminated sheet and a laminated tape are used in combination, a laminated material prepared in the above-described manner is cut out to obtain a laminated sheet having a size suitable for covering a portion from which fuel oil is likely to spout. Separately, a laminated tape is cut out from the laminated material. The laminated sheet is wound around a portion from which fuel oil is supposed to spout by at least two turns, and is pressed by hands to obtain close contact with the portion. Subsequently, the laminated tape is wound over the laminated sheet.

This method is suitable for portions having so complicated shapes that layered tapes cannot be wound around the portions.

The third method in which a laminated tape and a laminated sheet are used in combination with a protection cover provided for covering a high temperature surface is suitable for the case in which more complete prevention of fire is desired, though fire is substantially prevented by the laminated tape and the laminated sheet. In this case, fire can be prevented more effectively by providing a clearance between the high temperature surface and the protection cover.

Next, an example of the method of preventing fire in the engine room of a ship according to the present invention will be described with reference to FIGS. 3–6.

Figure 3:
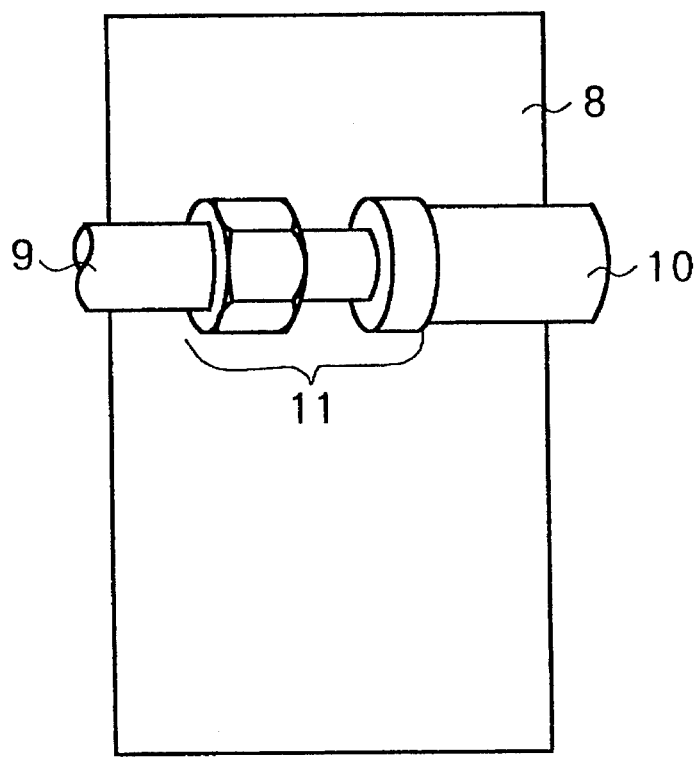
FIGS. 3–6 are perspective views showing an example of the method of preventing fire in the engine room of a ship according to the present invention.

In the example shown in FIG. 3, a portion 11 where a front end of a flexible tube 10 is screwed to a pipe 9 via a nut is to be covered.

First, a laminated sheet 8 having a width slightly wider than the portion 11 is attached to the portion 11, as shown in FIG. 3. The laminated sheet 8 has been obtained by cutting out the aforementioned laminated material. When standardized laminated sheets are available, a suitable laminated sheet is selected taking the width of the portion 11 into consideration.

Figure 4:
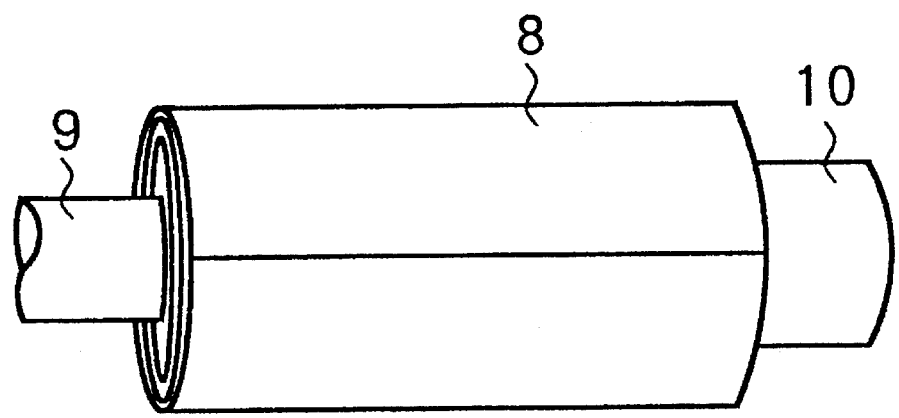
Figure 5:
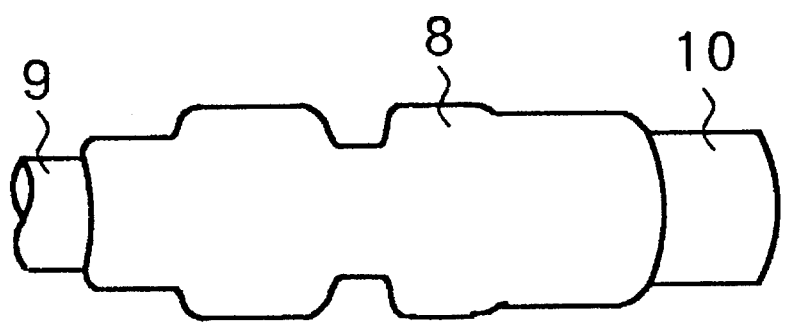
Figure 6:
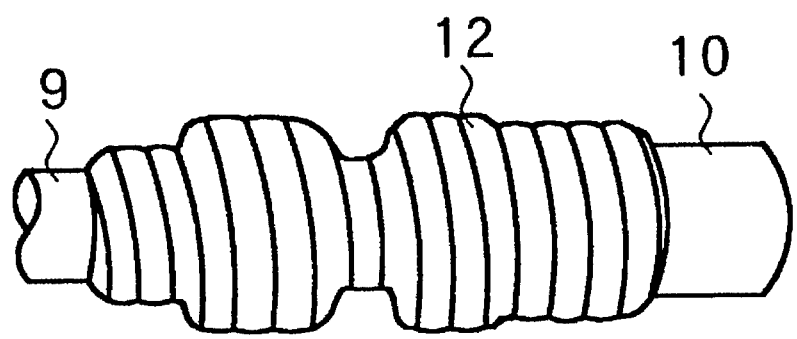

Subsequently, the laminated sheet 8 is wound around the portion 11 by at least two turns, as shown in FIG. 4. The laminated sheet 8 is then pressed by hands as shown in FIG. 5 so that the laminated sheet 8 closely contacts the portions 11. Thereafter, the laminated tape 12 having an adhesive layer on its one side is wound to fix the laminated sheet 8, as shown in FIG. 6.

The laminated tape 12 is selected from standardized laminated tapes having various widths. It is preferred that the width of the area over which the laminated tape is wound be slightly greater than the width of the laminated sheet 8. This arrangement effectively prevents spouting of fuel oil.

Although the method according to the present invention which prevents fire in the engine room of a ship has been explained with reference to the preferred embodiment, the present invention is not limited thereto, and another method shown in FIGS. 7–10 may be used according to the shape of the portion to be covered.

Figure 7:
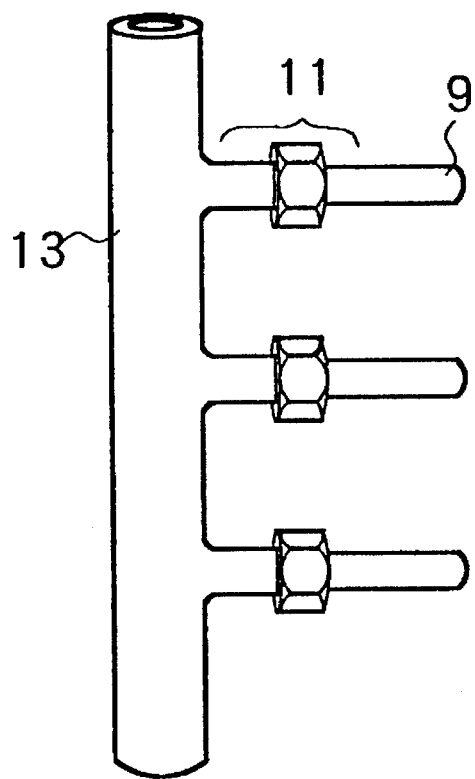
FIGS. 7–10 are perspective views showing another example of the method of preventing fire in the engine room of a ship according to the present invention.

In the example shown in FIG. 7, portions 11 where three pipes 9 are screwed to header pipes 13 are to be covered.

Figure 8:
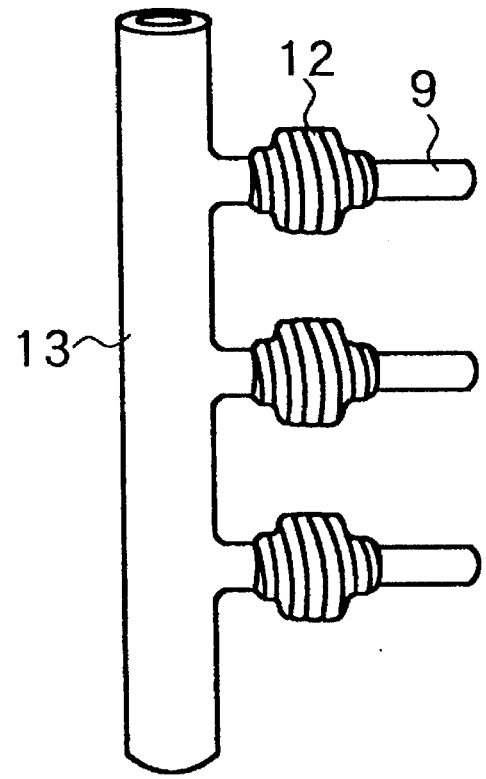

By winding a laminated sheet and a laminated tapes round the portion 11, a tight sealing is obtained as shown in FIG. 8.

Figure 9:
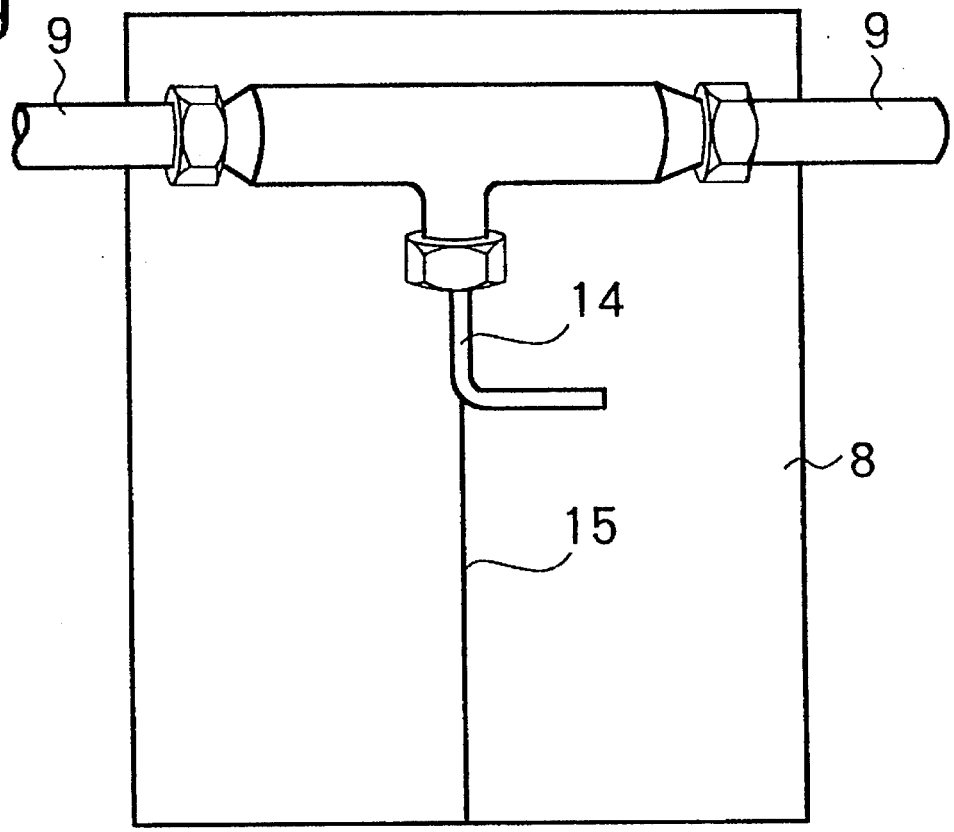

Moreover, laminated material according to the present invention can be used for covering a portion having a configuration as shown in FIG. 9. FIG. 9 shows the configuration of a portion including a cock 14 which is to be covered. This portion consists of three sub-portions from which oil is supposed to spout, i.e., two connecting portions at which two pipes 9, 9 are screwed, and the mounting portion of the cock 14.

To seal up the portion having the aforementioned configuration, the two connecting portions and the mounting portion of the cock 14 may be separately sealed up. However, another method may also be used in which the two connecting portions are sealed together, while the mounting portion of the cock 14 is sealed independently from the connecting portions.

In detail, a laminated sheet 8 having a width sufficient to cover the two connecting portions, as shown in FIG. 9 is used. Prior to or at the time when the laminated sheet 8 is attached to the connecting portions, a slit 15 is formed in the laminated sheet 8 at a location corresponding to the cock 14. With the slit, the sheet 8 can wrap up the connecting portions without interfering with the cock 14.

After the laminated sheet has been wound on the two connecting portions by at least two turns, the laminated sheet is pressed by hands to be in close contact with the connecting portions. Subsequently, a laminated tape is wound over the laminated sheet to obtain a tight sealing shown in FIG. 10.

Figure 10:
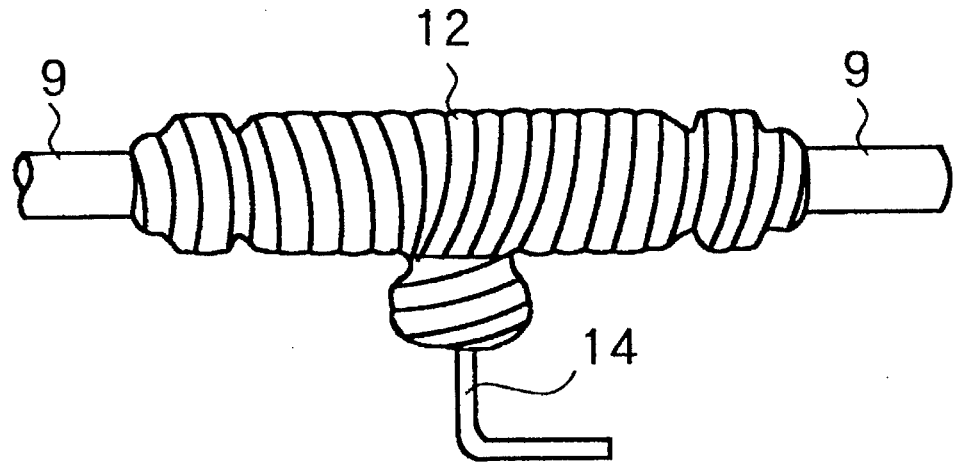

The above-described embodiment has demonstrated a method for preventing fire in the engine room of a ship in which a laminated tape and a laminated sheet are used in combination. In the case where only a laminated tape is used, the tape is wound from the beginning as shown in FIGS. 6, 8 and 10.

According to the method of the present invention, a portion from which oil is liable to spout can be covered only by a laminated tape if the shape of the portion is simple, and by a combination use of a laminated tape and a laminated sheet if the shape of the portion is complicated. The method according to the present invention thus provides excellent workability. Even unskilled persons can securely cover a portion from which oil is spouting. Moreover, the combination use of the laminated tape, a laminated sheet, and a protection cover for covering a high temperature surface makes it possible to prevent fire more completely.

What is claimed is:

1. A method of preventing fire in an engine room of a ship comprising the steps of:

providing a laminated material consisting of an aramid fabric base layer having an aluminum foil bonded to each surface thereof and a separable layer covering an adhesive on one of the aluminum foil covered surfaces;

identifying a portion of the engine room from which a flammable liquid is likely to spout;

cutting out the laminated material to obtain a laminated tape;

removing the separable layer from the laminated tape to expose the adhesive; and winding the laminated tape round the identified portion so that the exposed adhesive will adhere to one of the identified portion and the wound laminated tape and seal the identified portion so that the flammable liquid will not spout therefrom, whereby fire is prevented by stopping the flammable liquid from spouting and igniting when the liquid settles on a heated surface of the engine room.

2. A method of preventing fire in an engine room of a ship according to claim 1, further comprising the steps of:

using the laminated material as a protection cover for entirely covering a high temperature surface in the engine room with a clearance between the protection cover and the high temperature surface so that the flammable liquid is prevented from contacting the high temperature surface.

3. A method of preventing fire in an engine room of a ship comprising the steps of:

providing a laminated material consisting of an aramid fabric base layer having an aluminum foil bonded to each surface thereof and a separable layer covering an adhesive on one of the aluminum foil covered surfaces;

identifying a portion of the engine room from which a flammable liquid is likely to spout;

cutting out the laminated material to obtain a laminated sheet having a size suitable for covering the identified portion;

cutting out the laminated material to obtain a laminated tape;

removing the separable layer from the laminated tape to expose the adhesive;

winding the laminated sheet round the identified portion at least two turns;

pressing the laminated sheet onto the identified portion for close contact with the identified portion; and winding the laminated tape over the laminated sheet so that the exposed adhesive will adhere to at least one of the wound laminated sheet and the wound laminated tape and seal the identified portion so that the flammable liquid will not spout therefrom whereby fire is prevented by stopping the flammable liquid from spouting and igniting when the liquid settles on a heated surface of the engine room.

4. A method of preventing fire in an engine room of a ship according to claim 3, further comprising the steps of:

using the laminated material as a protection cover for entirely covering a high temperature surface in the engine room with a clearance between the protection cover and the high temperature surface so that the flammable liquid is prevented from contacting the high temperature surface.

5. The method of claim 3 further comprising the step of removing the separable layer from the laminated sheet to expose the adhesive before winding the laminated sheet round the identified portion.

6. A method of preventing a fire caused by a spouting flammable liquid contacting a heated surface comprising the steps of:

providing a laminated material comprising a fabric base layer having an aluminum or copper foil bonded to at least one surface thereof and a separable layer covering an adhesive on one of the aluminum foil covered surfaces;

identifying an area from which a flammable liquid is likely to spout;

removing the separable layer from the laminated material to expose the adhesive; and winding the laminated material around the identified portion so that the exposed adhesive will adhere to at least one of the identified portion and the wound laminated material and seal the identified portion so that the flammable liquid will not spout therefrom, whereby fire is prevented by stopping the flammable liquid from spouting and igniting when the liquid settles on a heated surface.

7. The method of claim 6 wherein the fabric base layer comprises one of polymeric, carbon, and glass fibers.

* * * * *